Figure 1:
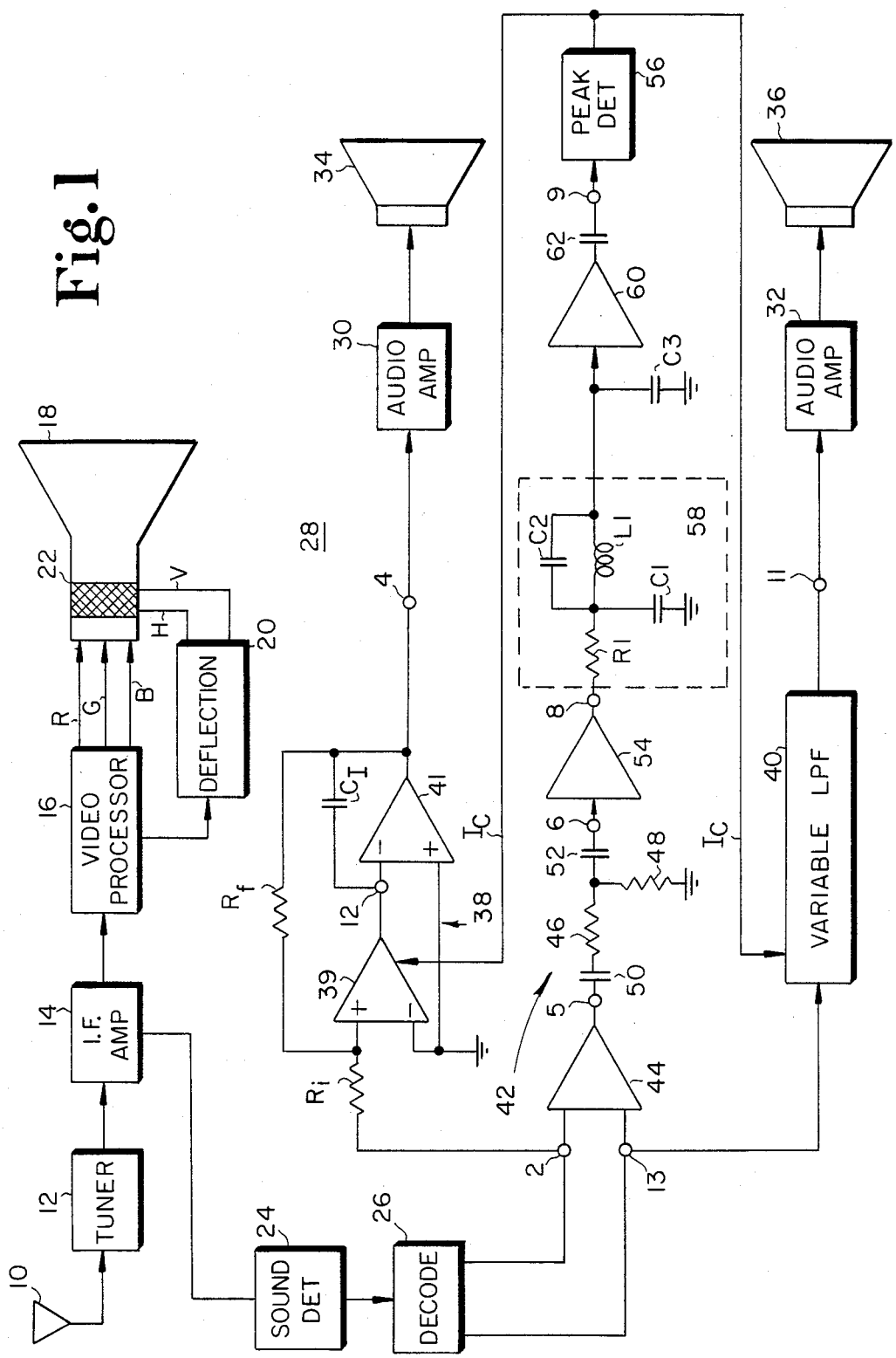

United States Patent [19]

Murphy, III et al.

[11] Patent Number: 4,517,602

[45] Date of Patent: May 14, 1985

[54] DYNAMIC NOISE FILTER FOR AN AUDIO SIGNAL IN A TELEVISION

[75] Inventors: Wesley W. Murphy, III; James Hettiger, both of Indianapolis, Ind.

[73] Assignee: RCA Corporation, New York, N.Y.

[21] Appl. No.: 434,935

[22] Filed: Oct. 18, 1982

[51] Int. Cl.³ .............................................. H04N 5/60
[52] U.S. Cl. ..................................... 358/198; 455/249
[58] Field of Search .......................... 358/198, 144, 36; 330/284; 333/17; 455/249, 306–312, 340, 355

[56] References Cited

U.S. PATENT DOCUMENTS

| | | | |
|---|---|---|---|
| 3,543,191 | 11/1970 | Plunkett | 333/17 |
| 3,678,416 | 7/1972 | Burwen | 333/17 |
| 3,753,159 | 8/1973 | Burwen | 333/17 |
| 4,239,939 | 12/1980 | Griffis | 358/198 |

OTHER PUBLICATIONS

National Semiconductor Datasheet Entitled "LM 1894 Dynamic Noise Reduction System DNR", by National Semiconductor Corp., Jan. 1982.
An Article Entitled "Audio Noise Reduction and Masking" by Martin Giles Distributed at the International Conference on Consumer Electronics held Jun. 1982, in Illinois.
National Semiconductor Linear Application Update, Document CLAU-129B, Issued Oct. 1981, pp. 11 and 19.
"Signals and Systems" by Alan V. Oppenheim and Alan S. Willsky, p. 424, published by Prentice-Hall, 1983.
"Analysis and Design of Analog Integrated Circuits" by Paul R. Gray and Robert G. Meyer, pp. 333–334, published by John Wiley & Sons, 1977.
Nationals Audio Handbook Data Sheet on AM, FM, and FM Stereo Section 3; "3.6.1 LM2111-LM1351 FM Amplifiers", pp. 3–13 Through 3–16, by National Semiconductor Corporation, 1976.

Primary Examiner—Tommy P. Chin
Assistant Examiner—Michael D. Parker
Attorney, Agent, or Firm—Eugene M. Whitacre; Peter M. Emanuel; Lawrence C. Edelman

[57] ABSTRACT

A dynamic noise filter especially adapted for use in audio reproduction systems within a television display device is provided to eliminate perceived noise. An audio signal having a relatively wide frequency range is passed through a variable bandwidth lowpass filter, the upper frequency cutoff point being variable in response to a control signal. A control path includes a filter and detector circuit for generating the control signal in response to the amplitude of the audio signal within an upper frequency portion of the audio signal frequency range. The control signal controls the bandwidth of the lowpass filter inversely with respect to the level of the audio signal within the upper frequency portion of the frequency range. A further filter is included in the control path for providing substantial attenuation at the fundamental frequency and lower order harmonic frequencies of the television horizontal line scanning signal in order to prevent the control path from erroneously responding to this signal.

6 Claims, 3 Drawing Figures

DYNAMIC NOISE FILTER FOR AN AUDIO SIGNAL IN A TELEVISION

The present invention relates to audio signal processing in a television display device and in particular to a dynamic noise filter arrangement for reducing perceived noise.

It is generally recognized that in an audio signal processing system, system noise can be reduced by reducing the frequency bandwidth of the system. Furthermore, a listener's awareness of audio noise can psychoacoustically be reduced. That is, the presence of a significant amount of audio signal energy content in the same frequency range as the noise can serve to acoustically "mask" the noise. Dynamic noise filter systems use these two principles for achieving noise reduction.

One type of dynamic noise filter system is used in the LM 1894 integrated circuit which is commercially available from National Semiconductor Corporation, Santa Clara, Calif. and is described in the 1982 National Semiconductor Databook, pages 10–172 to 178 and U.S. Pat. No. 3,678,416. In that system, the upper 3 dB frequency of a variable bandwidth lowpass filter in a main audio signal path is automatically and continuously controlled in response to the amplitude and frequency content of the audio signal. A parallel connected control signal path includes a highpass filter responsive to the audio signal for applying to a peak detector only the high frequency portion of the audio signal spectrum. The peak detector generates a control signal which is applied to the variable bandwidth filter of the main signal path. If the energy content of the high frequency portion of the audio signal is substantial, the control signal causes the bandwidth of the lowpass filter of the main signal path to increase. In this manner, the high frequency content of the reproduced audio signal is available to "mask" the system noise and reduce its perception. Conversely, if the amount of energy in the high frequency portion of the audio signal decreases, the masking ability of the reproduced audio signal is also decreased. Therefore, as the energy content of the high frequency portion of the audio signal decreases, the control signal decreases and causes the bandwidth of the lowpass filter to be reduced. Consequently, the system bandwidth is restricted and the noise output is reduced.

When such a system is used for processing a stereophonic audio signal, it is known to include with the highpass filter of the control path an additional filter for preventing the presence of the stereophonic pilot tone signal (e.g., 19 kHz in the U.S. FM broadcast standard) from being detected and "fooling" the noise reduction system into erroneously increasing the bandwidth of the main signal path. Without a pilot tone filter, the presence of the pilot tone will cause the bandwidth of the lowpass filter to remain wide open irrespective of the amount of energy in the high frequency portion of the audio signal.

It has been suggested that when such a dynamic noise filter as described above is used in a television display device, a control path notch filter similar to the type used for reducing the stereophonic pilot tone signal should be included for reducing the presence of the horizontal line scanning signal (e.g., 15.734 kHz in the NTSC system), in order to prevent the horizontal line scanning signal from "fooling" the dynamic noise filter in the same manner as the pilot tone signal in the above described stereophonic audio system.

Although it would seem that such a notch circuit tuned to the horizontal line scanning frequency would suffice, it is recognized by the present invention that due to the high amplitude and the non-sinusoidal nature of the line scanning signals in the deflection portion of the television display device, this approach is too simplistic. That is, significant amounts of energy exist at the second and third harmonics of the horizontal line scanning frequency, which frequencies are not affected by the notch filter and are able to pass through the highpass filter of the control path relatively unattenuated. Therefore, these harmonic signals can "fool" the dynamic noise filter system and severely decrease its effectiveness. It is desirable to provide a dynamic noise filter system which is not easily "fooled" when used in the environment of a television display device.

In accordance with the principles of the present invention a control path filter arrangement for a dynamic noise filter in a television display device has an amplitude versus frequency response characteristic with a substantially bandpass shape, for passing a substantial portion of the high frequency audio signal frequency range while substantially reducing the passage of the television line scan frequency and its lower order harmonic signals. Specifically, in a preferred embodiment, the control path filter arrangement includes a series connected capacitor for establishing a highpass amplitude versus frequency characteristic, a notch circuit tuned to the television line scanning frequency for attenuating the horizontal line scanning signal, and a further filter arrangement including a capacitor coupled in shunt at the output of the notch circuit for establishing a lowpass filter amplitude versus frequency characteristic for attenuating the harmonics of the horizontal line scanning frequency and, in combination with the notch filter, also for significantly increasing the attenuation of the horizontal line scanning signal over that produced by the notch filter alone.

In accordance with a further aspect of the invention, a buffer amplifier is coupled between the control path filter arrangement and the detector for providing a substantially constant impedance to the detector, independent of the audio signal frequency.

Figure 2:
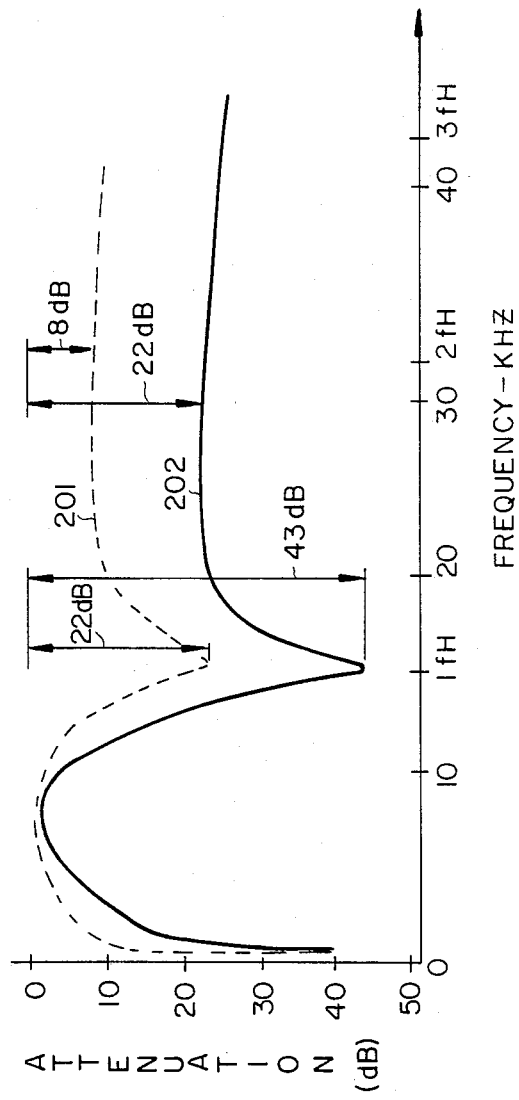
Figure 3:
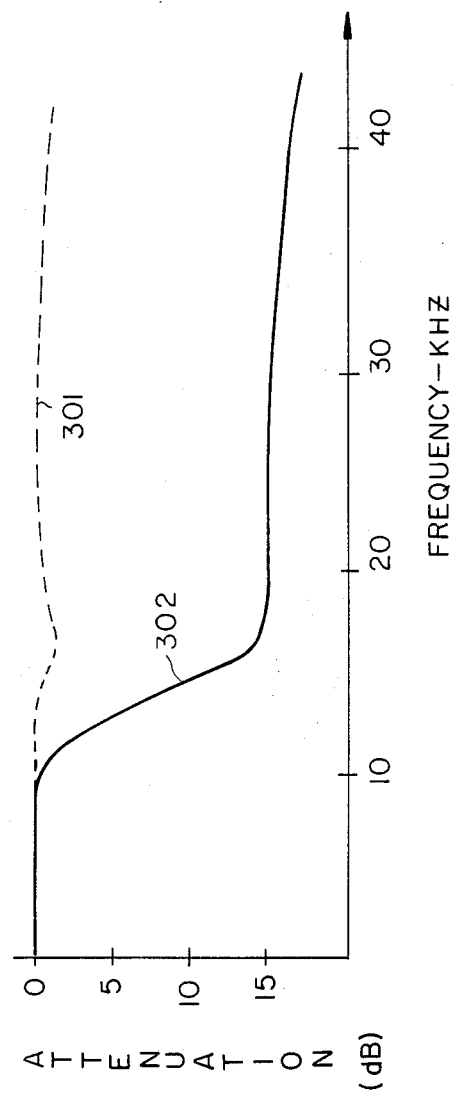

In the drawings:

FIG. 1 illustrates, partially in block diagram form and partially in schematic diagram form, a television receiver including an audio signal dynamic noise filter constructed in accordance with the principles of the present invention;

FIG. 2 illustrates amplitude versus frequency response curves for the control path filter arrangement of a dynamic noise filter constructed in accordance with the prior art and one constructed in accordance with the principles of the present invention; and FIG. 3 illustrates amplitude versus frequency response curves for the main signal path of a dynamic noise filter constructed in accordance with the prior art and one constructed in accordance with the principles of the present invention.

In FIG. 1, composite color radio frequency (RF) television signals received by an antenna 10 are applied to a tuner 12 which selects the received RF signals associated with a selected channel and converts them into intermediate frequency (IF) signals occupying a predesignated range of frequencies. An IF amplification stage 14 includes frequency selective components for applying substantially only the picture IF signal to a video processor 16. Video processor 16 derives a baseband video signal from the picture IF signal and processes the baseband video signal to produce the red (R), green (G) and blue (B) color image representative video signals which are applied to kinescope 18 for reproducing a color image thereon. Additionally, a deflection circuit 20 is responsive to the baseband video signal for generating horizontal (H) and vertical (V) synchronizing signals which are applied to the horizontal and vertical deflection coils 22 of kinescope 18 for generating a scanning raster. A sound detector 24 receives the IF signals from IF amplifier stage 14 and derives a composite audio signal therefrom. Illustratively, the composite audio signal includes an encoded stereophonic signal. Stereo decoder 26 is responsive to the composite audio signal for supplying at its output left and right stereophonically related audio signals. The left and right audio signals are then processed by a dynamic noise filter 28 and applied via audio amplifiers 30 and 32 to speakers 34 and 36 for reproducing the audio information. Audio amplifiers 30 and 32 preferably include user adjustable controls for adjusting the volume and tone of the reproduced audio signals.

Illustratively, dynamic noise filter 28 is of the aforenoted LM 1894 integrated circuit type and includes a left main signal path having a variable bandwidth lowpass filter 38 and a right main signal path having a variable bandwidth lowpass filter 40. Each of lowpass filters 38 and 40 has an upper 3 dB corner frequency which is variable between approximately 1 kHz and 30 kHz in response to an applied control signal. The full bandwidth of the left and right audio signals are applied from decoder 26 to terminals 2 and 13 (the reference numbers of the terminals correspond to the pin designations of the LM 1894) which are in turn coupled to terminals 4 and 11 via lowpass filters 38 and 40, respectively. Lowpass filters 38 and 40 each have a variable single pole lowpass configuration and, may be constructed, e.g., as shown for filter 38 as in the LM1894, using a variable transconductance amplifier 39 driving an operational amplifier integrator 41. Series connected resistors $R_i$ and $R_f$ are formed within the integrated circuit between terminals 2 and 4. The junction between these resistors is connected to the non-inverting input of amplifier 39 for determining the gain of the pass portion of the lowpass characteristic of filter 38. A capacitor $C_I$ is connected between terminals 4 and 12 for forming an integrator with amplifier 41.

A control signal path 42 is used for controlling the bandwidth of filters 38 and 40 and includes a highpass filter and a peak detector responsive to the audio signal for generating a control signal $I_c$ which is applied to the variable transconductance amplifiers of lowpass filters 38 and 40 for varying their bandwidth in response to the amount of high frequency energy within the audio signals.

More specifically, control path 42 includes a summing amplifier 44 connected to terminals 2 and 13 for sampling and combining the left and right audio signals. A highpass filter arrangement comprised of resistors 46 and 48 and capacitors 50 and 52 is connected between terminals 5 and 6 for passing the high frequency portion of the audio signal spectrum. An amplifier 54 coupled between terminals 6 and 8 provides approximately 26 dB of voltage gain to that portion of the audio signal which passes through the highpass filter arrangement coupled between terminals 5 and 6. A filter 58 including resistor $R_1$, capacitors $C_1$, $C_2$ and inductor $L_1$ followed by a shunt connected capacitor $C_3$, an isolation or buffer amplifier 60 and a series connected capacitor 62 are connected between terminal 8 and terminal 9. The purpose of the filter arrangement between terminals 8 and 9 is to reduce the susceptibility of control path 42 from being "fooled" by undesired signals, and will be discussed in detail further on. The value of capacitor 62 may also be used to help shape the highpass filter characteristic of control path 42. A peak detector 56 is responsive to the amount of audio signal at terminal 9 for generating the control signal $I_c$, which is applied to lowpass filters 38 and 40 for controlling their bandwidth in accordance with the energy content of the high frequency portion of an audio signal.

In operation, the manner in which dynamic noise filter 28 reduces a listener's awareness of noise is twofold. Firstly, as the energy content in the high frequency portion of the audio signal decreases, the control signal $I_C$ generated by control path 42 decreases and the bandwidth of lowpass filters 38 and 40 are consequently decreased. Thus, the bandwidth of the main signal path of the audio reproduction system is also reduced. It is generally accepted that a reduction in system bandwidth is accompanied by a corresponding reduction in the output noise level. Secondly, where there is substantial energy content in the high frequency portion of the audio signal, the control signal $I_C$ increases, thus increasing the bandwidth of lowpass filters 38 and 40 and allowing them to pass more of the entire spectrum of the audio signal. The presence of the high frequency energy within the reproduced audio reduces perceived noise by an auditory "masking" effect. That is, whenever one sound is being heard by a listener, it reduces the ability of the listener to hear another sound.

As previously noted, the purpose of notch filter 58 is to prevent control path 42 from being "fooled" by undesired signals. For example, if the audio signal being processed is a stereophonic signal including a pilot tone having a frequency within the audio signal bandwidth (e.g., 19 kHz for U.S. FM broadcast standards) the pilot tone will pass through the highpass filter arrangement of control path 42 and undesirably maintain control signal $I_c$ at a high level irrespective of the actual energy content within the high frequency portion of the audio signal. Thus, notch filter 58 can be tuned to provide substantial attenuation at the frequency of the pilot tone signal.

When a noise filter system as described above is used in a television receiver, it is known to tune notch filter 58 for attenuating the amplitude of signals having the horizontal line scanning frequency, which if not attenuated may cause improper operation of the noise filter in the same manner as mentioned above with respect to the pilot tone signal.

It has been recognized however, by the present inventors, that this approach is too simplistic, due to the high amplitude and non-sinusoidal nature of the horizontal line scanning signal developed by the deflection circuitry of the television receiver. Thus, there exists within the television receiver cabinet strong high frequency signals corresponding to the fundamental frequency of the horizontal line scanning signal and several of its lower order harmonics which are radiated from, for example, the flyback transformer and are picked-up by the leads and terminals of the filter arrangements of control path 42. More specifically, the second and third harmonics of the horizontal line scanning signal are particularly troublesome since they fall within a frequency range which is more easily picked-up and are passed relatively unattenuated by control path 42 to peak detector 56.

In this regard, although notch filter 58 of control path 42 may be tuned to attenuate the fundamental frequency of the horizontal line scanning signal, the second and third harmonics are relatively unattenuated by the highpass filter characteristic of control path 42. Thus, in accordance with the principles of the present invention, the highpass filter characteristic of control path 42 is modified to provide a substantially bandpass shape for passing relatively unattenuated the upper frequency portion of the audio signal spectrum but providing substantial attenuation at the fundamental frequency of the horizontal line scan signal and several of its lower order harmonics. Specifically, this is accomplished by the addition of shunt capacitor $C_3$ at the output of notch filters 58. Buffer amplifier 60 presents a relatively constant impedance to the input of peak detector 56 and provides isolation from the varying output impedance presented by the filter arrangement of control path 42. Additionally, the input impedance of buffer amplifier 60 is selected to provide a desired terminating impedance for the filter 58 and capacitor $C_3$ combination. Furthermore, it may be desirable to include a DC blocking capacitor (not shown) serially coupled between amplifiers 58 and 60 to reduce the current drain from amplifier 58 due to the terminating impedance presented by buffer amplifier 60.

Capacitor $C_3$ provides a shunt impedance which decreases with increasing frequency and thus provides a lowpass response characteristic having increasing attenuation within control path 42 for reducing the level of the second and third harmonics of the horizontal line scanning signal. Furthermore, capacitor $C_3$ provides another benefit by significantly increasing the attenuation provided by notch filter 58 at the fundamental frequency of the horizontal line scanning signal. This is accomplished because capacitor $C_3$ reduces the impedance which notch filter 58 is working into, thereby greatly increasing its effectiveness.

Referring to FIG. 2, waveform 201 (dashed line) is a plot of the relative amplitude versus frequency response for control path 42 without capacitor $C_3$ and amplifier 60. Filter 58 is tuned to suppress the fundamental frequency of the horizontal line scan signal (e.g., 15.734 kHz) and provides approximately 22 dB of attenuation at that frequency. Capacitors $C_1$, $C_2$ and 62 are responsible for providing the substantially highpass shape of response 201. Notch filter 58 is tuned to be resonant at the fundamental frequency ($f_H$) of the horizontal line scanning signal. Above that frequency, however, response 201 is substantially flat and more importantly provides only approximately 8 dB of attenuation of the frequencies of the second and third harmonics ($2f_H$ and $3f_H$) of the horizontal line scanning frequency.

Waveform 202 (solid line) shows the relative amplitude versus frequency response for control path 42 when capacitor $C_3$ and buffer amplifier 60 are included. At frequencies less than $f_H$, response 202 is substantially bandpass shaped. As compared with waveform 201 for the circuit without capacitor $C_3$, an additional 21 dB of attenuation is provided at $f_H$. This corresponds to a greater than tenfold increase in attenuation produced by control path 42 at this frequency. Furthermore, a greater than fivefold increase in attenuation is provided at $2f_H$ and $3f_H$ (i.e., an additional 14 dB). Although one would expect the shunt impedance provided by capacitor $C_3$ to cause response 202 to have a $-6$ dB per octave slope with increasing frequency, its attenuation affect on control path 42 is somewhat compensated for by the corresponding increase in ability of the series connected capacitors of the highpass filter, i.e., capacitors 50, 52 and 62, to pass signals as the frequency increases.

FIG. 3 shows an actual comparison of the deleterious effect upon the ability of the lowpass filters of dynamic noise filter 28 to reduce their bandwidth in the presence of relatively strong interference by the non-sinusoidal horizontal line scanning signal. Response 301 (dashed line) is an attenuation versus frequency response for lowpass filter 38 when capacitor $C_3$ and buffer amplifier 60 are not included in control path 42, experimentally determined by applying the output signal of an audio signal sweep generator which provides a 0 to 50 kHz frequency sweep at input terminal 2 together with an equal amplitude horizontal line scanning signal obtained by looping a piece of stranded wire around the flyback transformer of the television receiver. As clearly shown by response 301, the relatively strong interference signals at $f_H$, $2f_H$ and $3f_H$ are not attenuated enough by control path filter 42 (response 201 of FIG. 2) and the dynamic noise filter system erroneously provides a wide bandwidth irrespective of the frequency content of the audio signal.

In contrast, response 302 (solid line) shows the response of lowpass filter 38 when capacitor $C_3$ and buffer amplifier 60 are included in control path 42 under substantially the same experimental conditions noted above but with notch filter 58 retuned to compensate for the effect of added capacitor $C_3$. Note that the significant extra attenuation provided by the modified control path 42 (response 202 of FIG. 2) provided enough additional attenuation at the fundamental frequencies of the horizontal line scanning signal and its lower order harmonics to prevent dynamic noise filter 28 from being "fooled" by this strong interfering signal. Although a test of this nature, wherein the interfering signal is of the same amplitude as the desired audio signal, may seem extreme, it exemplifies the benefits provided by the improved bandpass characteristic of control path 42. With such an improved control path characteristic greater freedom is achieved for the placement of the audio circuitry within the television receiver resulting in improved packaging density and lower manufacturing cost.

Typical values for the components of the FIG. 1 embodiment are as follows:

| resistors | capacitors | inductors |
| --- | --- | --- |
| $R_i = R_f = 20,000\ \Omega$ | $C_I = .0039\ \mu F$ | $L_1 = 3.3\ mH$ |
| $R_{46} + R_{48} = 1,000\ \Omega$ | $C_{50} = .1\ \mu F$ | |
| $R_1 = 91\ \Omega$ | $C_{52} = .001\ \mu F$ | |
| | $C_1 = .18\ \mu F$ | |
| | $C_2 = .033\ \mu F$ | |
| | $C_3 = .1\ \mu F$ | |
| | $C_{62} = .033\ \mu F$ | |

Buffer amplifier 60 comprises a common emitter amplifier stage having a voltage bias network which presents 330$\Omega$ as the desired teminating impedance for filter 58 and capacitor $C_3$.

Typical FIG. 1 component values for providing responses 201 of FIG. 2 and 301 of FIG. 3 are the same as shown above except $R_1 = 100\Omega$, $C_1 = 0.1\ \mu F$, $C_2 = 0.015$ μF, $C_{62}=0.047$ μF and $L_1=5.7$ mH. Note $C_3$ and buffer amplifier 60 are omitted.

Finally, it should be noted that although the sum of resistors 46 and 48 are shown as being equal to 1000Ω, the ratio of their individual resistance values can be varied in order to adjust the signal level provided to detector 56 and thus control the noise threshold level of dynamic noise filter 28.

What is claimed is:

1. A dynamic noise filter for reducing perceived noise in a reproduced audio signal having an audio frequency range which is processed by an audio signal channel having a relatively wider channel frequency range in a television display device, said dynamic noise filter comprising:

means, coupled to receive said audio signal, for providing a variable amount of attenuation within an upper frequency portion of said audio signal frequency range, in response to the level of a control signal;

means for generating said control signal in response to the amplitude of signals within an upper frequency portion of said channel frequency range including said audio signals within said upper frequency portion of said audio frequency range;

said generating means including a serially coupled filter and signal detector for determining the level of said control signal, said control signal controlling said audio signal attenuation provided by said first mentioned means in a manner inverse to the amplitude of said audio signal within said upper frequency portion of said audio frequency range, wherein said filter has an amplitude versus frequency response characteristic in said channel frequency range of substantially bandpass shape, for passing relatively unattenuated audio signals at frequencies within said upper frequency portion of said channel frequency range which are less than the fundamental frequency of the television horizontal line scanning signal and for providing substantial attenuation to signals at frequencies within said channel frequency range which are greater than said fundamental frequency and include the signals at frequencies of at least some of the lower harmonics of said horizontal line scanning signal such that said signal detector provides no substantial change in control signal level for signals at said fundamental and lower harmonics of said horizontal line scanning signal.

2. An improved dynamic noise filter for reducing perceived noise in an audio signal which is processed in an audio signal channel having a relatively wider channel frequency range in a television display device, said dynamic noise filter comprising:

means coupled to receive said audio signal, for providing a relatively constant amount of attenuation to frequencies of said audio signal within a lower frequency portion of said channel frequency range and providing a variable amount of attenuation to said audio signal within an upper frequency portion of said channel frequency range, said variable amount of attenuation being controlled in response to the level of an applied control signal;

control path filter means coupled to receive said audio signal for generating and determining the level of said control signal in response to the amplitude of said audio signal within said upper frequency portion of said channel frequency range, said control path filter means including, serially connected, means for forming a highpass filter for passing relatively unattenuated signals in said upper portion of said channel frequency range, means for providing a notch filter response for attenuating the horizontal line scanning signal of the television display device at its fundamental frequency and a detector for generating said control signal, said variable attenuation means varying said attenuation inversely with respect to the amplitude level of said control signal, wherein the improvement comprises:

a further filter means coupled between said notch filter means and said detector for increasing the attenuation provided by the said notch filter means at said fundamental frequency and for providing substantial attenuation at the frequencies of the second and third harmonics of said horizontal line scanning signal such that said detector provides no substantial change in control signal level for signals at said fundamental and lower harmonics of said horizontal line scanning signal.

3. The dynamic noise filter of claim 2 further including an isolation means coupled between said further filter means and said detector for presenting a substantially constant impedance to said detector independent of said audio signal frequency.

4. The dynamic noise filter of claim 2 wherein said further filter means comprises a shunt element coupled at the output of said notch filter means.

5. The dynamic noise filter of claim 4 wherein said highpass filter means comprises a first capacitor, said notch filter means comprises at least a series connected parallel combination of an inductor and a second capacitor and said further filter means comprises a third capacitor coupled in shunt at the output of said notch filter means.

6. The dynamic noise filter of claim 5 further including an isolation means coupled between said third capacitor and said detector for presenting a substantially constant impedance to said detector independent of said audio signal frequency.

* * * * *